May 17, 1966  S. M. LOVELESS ET AL  3,251,378

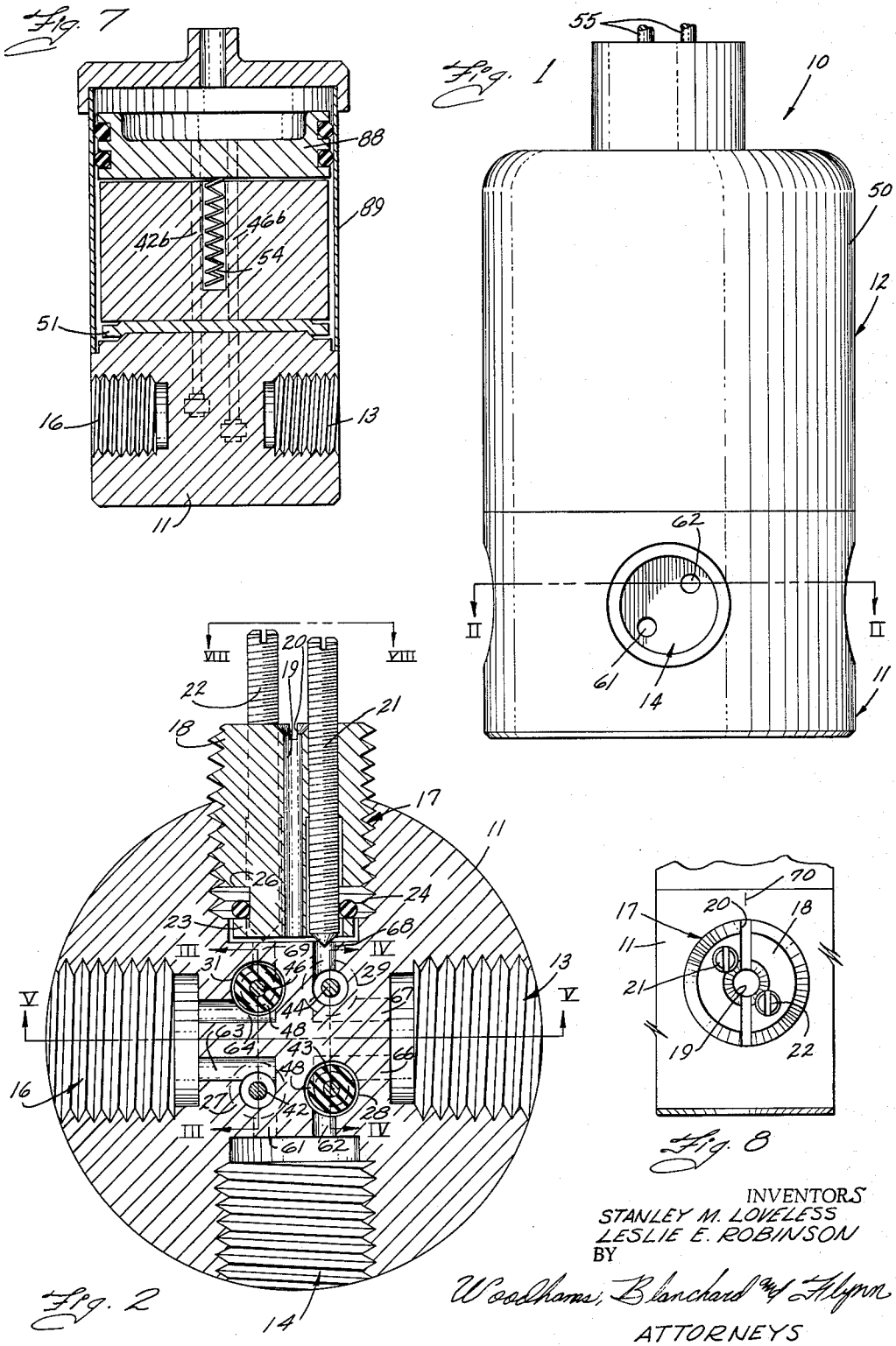

FOUR-WAY VALVE CONSTRUCTION

Filed July 30, 1964  2 Sheets-Sheet 2

INVENTORS
STANLEY M. LOVELESS
LESLIE E. ROBINSON
BY
Woodhams, Blanchard & Flynn
ATTORNEYS United States Patent Office 3,251,378
Patented May 17, 1966

3,251,378
FOUR-WAY VALVE CONSTRUCTION
Stanley M. Loveless, Oshtemo Township, Kalamazoo County, and Leslie E. Robinson, Kalamazoo Township, Kalamazoo County, Mich., assignors to General Gas Light Company, Kalamazoo, Mich., a corporation of Michigan
Filed July 30, 1964, Ser. No. 386,218
13 Claims. (Cl. 137—596.17)

This invention relates to an improved valve construction and, more particularly, relates to an improved four-way valve construction which is relatively inexpensive, small and light in weight, which is fast-acting and which has a large fluid flow capacity for its size.

A wide variety of four-way valve constructions have been suggested heretofore and many of these are quite satisfactory for a variety of purposes. However, many such valves are relatively bulky and expensive and have a greater capacity than is needed for many service requirements. Other valves of this type do not operate at a sufficiently rapid rate to meet some service requirements. Hence, it commonly happens that the larger, more expensive, four-way valves are used in fluid pressure circuits to assure satisfactory operation, even though they provide excess capacity, because there is not presently available a relatively small, less expensive, four-way valve capable of meeting service requirements. This is particularly true with electrically operated four-way valves.

A further problem encountered with the prior art valve constructions is to provide an effective adjustable control over the rate of exhausting the pressure fluid, particularly to provide a control which is simple, small and inexpensive and which can be applied or removed easily under field conditions as desired.

Accordingly, it is an object of this invention to provide an improved four-way valve construction which is relatively small and inexpensive, but which has a large fluid flow capacity for its size, and which is fast-acting.

It is a further object of this invention to provide a four-way valve, as aforesaid, which consists of a minimum number of simple and inexpensive-to-make parts so that it can be manufactured at minimum cost.

It is a further object of this invention to provide an improved four-way valve which is especially well adapted for electrical actuation but can also be actuated mechanically or by fluid pressure, if desired.

It is a further object of this invention to provide a device for controlling the rate of exhausting the pressure fluid, which device is simple, small and inexpensive and which can be applied or removed easily under field conditions as desired.

It is a further object of this invention to provide an improved four-way valve employing a minimum number of moving parts, which parts can be moved simultaneously in a straight-line fashion and for a short distance in order to change the setting of the valve whereby the valve is very simple to operate and is fast-acting.

Other objects and advantages of the invention will be apparent to persons acquainted with equipment of this type upon reading the following description and inspecting the accompanying drawings.

In the drawings:

FIGURE 1 is a front elevational view of a valve construction embodying the invention.

FIGURE 2 is a sectional view taken along the line II—II of FIGURE 1.

FIGURE 7 is a view similar to FIGURE 5 showing yet another modification of the invention.

FIGURE 8 is a view taken along the line VIII—VIII of FIGURE 2.

*General description*

Figure 3:
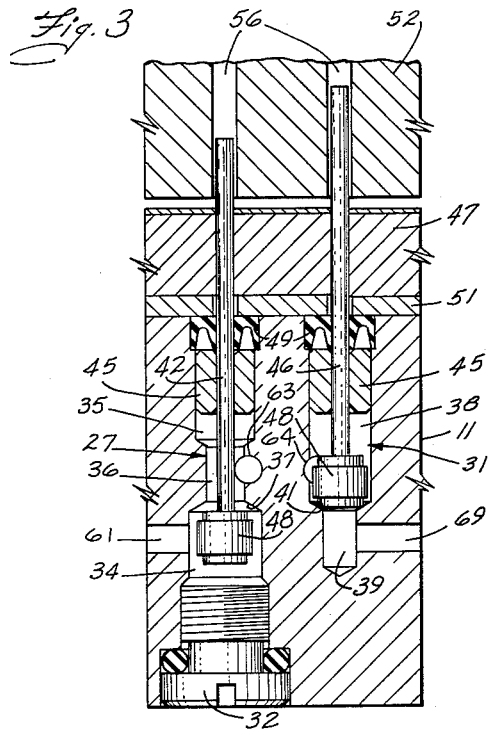
FIGURE 3 is a sectional view taken along the line III—III of FIGURE 2.

According to the invention, there is provided a four-way valve construction comprising a valve body having four ports therein and also having a plurality of passageways, each port being connected by passageways to two others of the ports so that each port can selectively communicate with the two other ports. A valve is disposed in each of these passageways for controlling fluid flow therethrough and the valves are arranged so that one passageway from each port is open and the other passageway is closed, this condition being reversible by suitable operation of the valves. Actuation means is connected to the valves for simultaneously shifting same in order to control the connection of the ports to each other.

*Detailed description*

The valve construction 10 to which the invention relates, comprises a valve body 11 and an actuating section 12. The valve body 11 is here shown as being circular in cross section, although other shapes, including square, can be used. The valve body 11 has four substantially radially extending ports 13, 14, 16 and 17 which open through the outer surface thereof. The ports are threaded for connection to conduits in a conventional fashion. In the illustrated embodiment, ports 13 and 16 are outlet ports which can be connected to loads, such as the opposite ends of the same cylinder or to separate cylinders. Port 14 is an input port and port 17 is an exhaust port. Since the valve construction is symmetrical, however, it will be understood that the port arrangement described above is merely illustrative of one typical connection of the ports.

A plug 18 (FIGURE 2) is threaded into the port 17 in this embodiment of the invention, and said plug has a central opening 19 through which fluid can escape. The plug 18 has a slot 20 in its outer end so that a tool, such as a screw driver, can be inserted therein in order to thread the plug into or out of the port 17. The plug 18 carries two needle valves 21 and 22 which are threadedly mounted therein for purposes to be described hereinbelow. The plug 18 also has an inner end portion 23 of reduced diameter which is spaced at its sides and at its inner end from the opposing walls of the port 17. An O-ring 24 is provided in a groove 26 in the plug 18, said groove intersecting the openings through which the needle valves 21 and 22 extend. The O-ring 24, therefore, contacts the needle valves 21 and 22 and prevents unintentional movement of them from their adjusted positions due to vibrations, etc.

The valve body 11 has four parallel openings 27, 28, 29 and 31 (FIGURES 2, 3 and 4) formed therein and these openings extend perpendicularly to the axes of the ports 13, 14, 16 and 17 and are disposed in the zone between the inner ends of said ports. Openings 27 and 29 are identical and they both extend all the way through the valve body 11. The openings 27 and 29 are closed at their lower ends by plugs 32 and 33. Openings 28 and 31 are identical and they extend only part way through the valve body 11 from the top thereof. As described in further detail hereinafter, the openings 28 and 31 have sections which are of progressively smaller diameter from the top to the bottom thereof. It will be noted that the openings 27, 28, 29 and 31 can be formed by simple drilling operations. It will also be noted that these openings are arranged in closely spaced relationship and yet they have ample cross-sectional areas so that a valve body of small size can still provide ample fluid flow areas.

The openings 27 and 29 each have a lower portion 34 of larger diameter, an intermediate portion 36 of small diameter, with a valve seat 37 being provided therebetween. The openings 27 and 29 also have an upper portion 35 of intermediate diameter. Similarly, openings 28 and 31 each have an upper portion 38 of larger diameter and a lower portion 39 of smaller diameter with a valve seat 41 being provided therebetween. The valve seats 37 and 41 are substantially coplanar but they face in opposite directions.

Valve rods 42, 43, 44 and 46 are secured to an actuation plate 47 and they extend respectively into the openings 27, 28, 29 and 31. Tubular rod guides 45 are disposed in the portions 35 and 38 of said openings for guiding movement of said rods. The valve rods each have a valve element 48 mounted on their lower ends for sealing engagement with the respective valve seats 37 and 41 of the openings into which they extend. The valve rods 42, 43, 44 and 46, in the embodiment shown in FIGURES 1–5, are of the same length and construction so that they are interchangeable. However, the valve rods 42 and 44 are offset vertically downwardly with respect to the valve rods 43 and 46, the arrangement being such that when the valve elements 48 on the rods 43 and 46 engage their associated valve seats 41, the valve elements on the rods 42 and 44 are spaced from their associated valve seats 47 and vice versa.

The rods 42, 43, 44 and 46 are sealed by sealing elements 49 which are mounted in the upper ends of the openings 27, 28, 29 and 31 and said sealing elements are retained in place by a plate 51 which is secured to the valve body 11.

Figure 5:
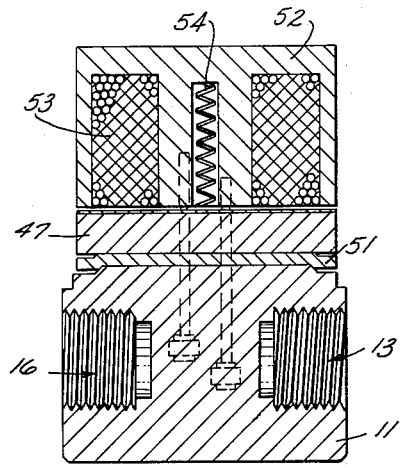
FIGURE 5 is a sectional veiw, on a reduced scale, taken along the line V—V of FIGURE 2.

The actuating section 12 includes a cover 50 (FIGURE 1) within which are disposed the actuation plate 47 and a head 52. The head 52 is secured to and is disposed in spaced relation to the valve body 11 with the actuation plate 47 being disposed in, and mounted for movement within, the space therebetween. An annular electromagnetic coil 53 (FIGURE 5) is mounted in the head 52 and is connected to a suitable supply circuit (not shown) by conductors 55 (FIGURE 1) so that it can be energized in a suitable fashion. The actuation plate 47 is made of magnetizable material so that when the coil 53 is energized the plate 47 is moved upwardly against the contrary urging of the spring 54 (FIGURE 5). In this embodiment, the rods 42, 43, 44 and 46 extend into suitable openings 56 in the head 52 so that they can slide therewithin when the actuating plate 47 is moved.

Each port is connected to the two adjacent ports by passages. One of the openings 27, 28, 29 and 31 intersects each passage so that the valve element therein controls flow of pressure fluid through the passage. Thus, two vertically offset passageways 61 and 62 are drilled through the inner end wall of the port 14. Passageway 61 communicates with the portion 34 of opening 27 and passageway 62 communicates with the portion 38 of the opening 28. Two passageways 63 and 64, which are coplanar with the passageway 62, extend from the inner end wall of the port 16. Passageway 63 communicates with the portion 36 of the opening 27 and passageway 64 communicates with the portion 38 of opening 31. Two further passageways 66 and 67, which are coplanar with the passageway 61, extend from the inner end wall of the port 13. Passageway 66 communicates with the portion 39 of the opening 28 and passageway 67 communicates with the portion 34 of the passageway 29. Two vertically offset passageways 68 and 69 extend from the inner end of the port 17. Passageway 68 communicates with the portion 36 of opening 29 and passageway 69 communicates with portion 39 of opening 31.

The needle valve 21 is aligned with the passageway 68 and needle valve 22 is aligned with passageway 69 whereby the rate of fluid flow through said passageways 68 and 69 can be individually adjusted. In order to align the needle valves 21 and 22, the slot 20 can be used to insure the proper positioning of the plug 18. If desired, a scribe mark 70 can be placed on the body 11 so that when the slot 20 is aligned with said mark, the needle valves 21 and 22 will be aligned with the openings 68 and 69. It is to be noted that the passageways 61 through 64 and 66 through 69 can be formed into valve body 11 by simple drilling operations.

*Operation*

Figure 4:
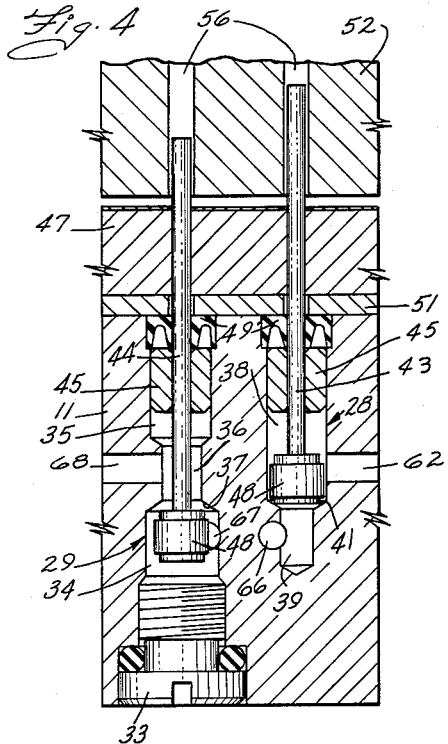
FIGURE 4 is a sectional view taken along the line IV—IV of FIGURE 2.

Assuming that the coil 53 is de-energized and the parts are positioned as shown in FIGURES 3 and 4, pressure fluid supplied to the port 14 from a suitable source flows through the passageway 61 into the opening 27 thence through passageway 63 to the outlet port 16. The outlet port 16 is blocked from communication with the exhaust port 17 because the valve element 48 in chamber 31 is sealingly engaging its associated valve seat. Further, fluid cannot flow from the passageway 62 to the passageway 66 because the valve element in the opening 28 is sealingly engaging the valve set thereof. However, port 13 is connected to the exhaust port 17 through the passageways 67 and 68 because the valve element in opening 29 is spaced from its associated valve seat. Hence, the outlet port 16 is connected to the inlet port 14 while the outlet port 13 is connected to the exhaust port 17.

When the coil 53 is energized, the plate 47 is moved upwardly which causes the valve elements 48 in chambers 27 and 29 to sealingly engage their associated valve seats and simultaneously causes the valve elements in chambers 28 and 31 to move away from their valve seats. Thus, fluid supplied to the port 14 passes through the passageways 62 and 66 into the outlet port 13 and said outlet port 13 is blocked from communication with the exhaust port 17 because the valve element in opening 29 sealingly engages its valve seat. Inlet port 14 is blocked from communication with the outlet port 16 because the valve element in opening 27 sealingly engages its valve seat. However, the outlet port 16 is connected to the exhaust port 17 through the passageways 64 and 69 which are in communication with each other because the valve element in opening 31 is spaced from its valve seat.

When the coil 53 is de-energized, the parts return to their initial positions as described above.

It will be noted that the needle valves 21 and 22 provide an adjustable control over the rate of flow of fluid from whichever outlet ports 13 and 16 is connected to the exhaust port 17. For example, when both outlet ports 13 and 16 are connected to opposite ends of the same load, such as a cylinder, the piston therein can travel faster in one direction than in the other because there can be a greater rate of flow of fluid exiting from the cylinder through one outlet port than the other. Where the two outlet ports 13 and 16 are connected to separate loads, such as two separate cylinders whose pistons are spring-urged into one position, this means that one piston will be returned by its spring to the de-energized position faster than will be the other piston. Hence, the provision of the separately adjustable needle valves 21 and 22 makes it possible to provide a variety of control functions in order to control the time of de-energization of the loads connected to the outlet ports 13 and 16.

The exhaust control device comprising plug 18, needle valves 21 and 22 and the parts connected therewith can be applied to or removed from the port 17 as a unit and

Modifications

Figure 6:
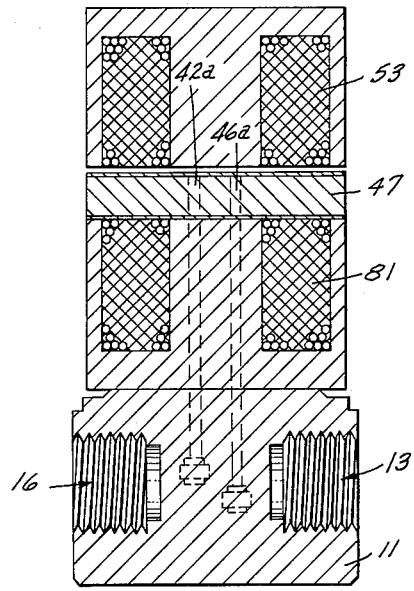
FIGURE 6 is a view similar to FIGURE 5 and showing a modified construction according to the invention.

FIGURE 6 illustrates a modification in which in place of the coil spring 54, there is provided a second electromagnetic coil 81 which is disposed on the opposite side of the plate 47 from the coil 53. Thus, when one or the other of the coils 53 and 81 is energized, the plate 47 will be attracted towards the energized coil and will remain in such position until the other coil is energized. Thus, the operation of the valve is responsive to a variety of dual function electrical control circuits, such as a single pole, double throw switch. Further, such switches need have only a momentary contact in order to place the valve in one position or the other whereas in the principal embodiment of the invention the coil 53 must be continuously energized in order to maintain the valve in the position opposite that shown in FIGURES 2 and 3. The valve rods, two of which are shown at 42a and 46a, can be of unequal length in this embodiment.

FIGURE 7 shows a further modification in which in place of the coil 53 and plate 47, the rods, two of which are shown at 42b and 46b are connected to a piston 88 which is slideable within a cylinder 89. Thus, when pressure is supplied to the cylinder 89, the rods can be moved contrary to the urging of the spring 54 in order to shift the valve. The valve rods can be of unequal length in this embodiment.

It will be evident that many types of control arrangements, including mechanical controls, can be used for moving the plate 47 into one position or the other in order to shift the valve elements as above described.

It will be noted that the fluid pressure is always applied in such a direction as to urge all the valve elements 48 toward their associated valve seats. Thus, passageways 61, 62, 64 and 67, which are the passageways in which fluid under pressure will flow, are connected to the same chambers in which the valve elements 48 are located so that such fluid pressure, when present, will urge the valve elements toward their associated valve seats.

While particular preferred embodiments of the invention have been described, the invention contemplates such changes or modifications therein as lie within the scope of the appended claims.

What is claimed is:

1. A four-way valve construction, comprising:
    a valve body having four ports therein and also having a plurality of passageways, each port being connected by a pair of said passageways to two others of the ports so that each port can selectively communicate with said two other ports;
    a valve movably disposed in each of said passageways for selectively blocking flow of fluid therethrough, means for positioning said valves in a first position in which one passageway from each port is open and the other passageway is closed; and
    actuating means including a common actuator member fixed with respect to said valves and movable with respect to said valve body for simultaneously shifting all of said valves to a second position in which said one passageway from each port is closed and the other passageway is open.

2. A valve construction according to claim 1, in which each passageway includes a portion of large diameter and a portion of small diameter with a valve seat being provided therebetween and each valve includes a rod reciprocably slideable within said passageway and extending out of said passage into connection with said actuator member, each of said rods carrying an enlarged valve element which is received in the large portion of the passageway and is adapted for sealing engagement with said valve seat.

3. A valve construction according to claim 2 in which some of said rods extend from their associated valve elements in a direction away from their associated valve seats and the remaining rods extend loosely through the valve seats associated therewith.

4. A valve construction according to claim 2, in which said actuator member is a flat plate and each of said rods is connected to said plate whereby movement of said plate shifts all of said rods simultaneously.

5. A valve construction according to claim 4, in which said actuating means includes an electromagnetic device and said actuator plate is movable in at least one direction by said electromagnetic device.

6. A valve construction according to claim 4 in which said actuator plate is a pressure fluid piston.

7. A valve construction according to claim 1, in which the pressure fluid is supplied to the portions of large diameter of said passageways so that when said large portions are pressurized, the fluid pressure urges said valve elements toward said valve seats.

8. A valve construction according to claim 1, in which said ports extend substantially radially so that their axes are spaced apart about 90°, the inner ends of said ports being spaced apart and said passageways extending between the inner ends of the ports, said valves being four in number and arranged in a substantially rectangular cluster in the space between the inner ends of the ports.

9. A valve construction according to claim 1, including apertured plug mounted in one of said ports, said plug having two needle valves adjustably mounted thereon and respectively aligned with the two of said passageways leading from said one port whereby the rate of flow of fluid through said two passageways can be adjusted.

10. A four-way valve construction according to claim 1, in which the valve body is a substantially circular valve body and has four substantially radially extending ports opening through the periphery thereof, the axes of said ports being spaced apart about 90° and the inner ends of said ports being spaced from each other;
    means defining four substantially L-shaped passageways in said valve body, corresponding legs of two of said passageways communicating with the inner end of one of said ports and the other legs of said two passageways being in communication with the inner ends of the ports on either side of said one port, said two legs of each passageway being offset in a direction perpendicular to the axes of said ports;
    means defining four parallel openings in said valve body, each opening intersecting one of said passageways substantially at the zone where the legs meet, each opening having a portion of large diameter and a portion of small diameter with a valve seat therebetween, said valve seat being disposed between the legs of its associated passageway;
    a valve rod slideably disposed within each of said openings and extending beyond one end of said valve body, said valve rod having a valve element mounted thereon and located in the large portion of its associated passageway and being adapted for sealing engagement with the valve seat of its associated passageway;
    an actuator plate secured to all of said valve rods and means mounting said actuator plate for movement in a direction lengthwise of said openings whereby said valve rods can be simultaneously moved, said valve rods being connected to said actuator plate so that two of said valve elements in one terminal position of said actuator plate simultaneously sealingly engage their associated valve seats and the other two valve elements are spaced from their associated valve seats, and in the other terminal position of said actuator plate the positions of the valve elements are reversed; and
    means for moving said actuator plate.

11. A valve construction according to claim 1, in which each passageway includes a portion of large diameter and a portion of small diameter with a valve seat being provided therebetween, said large diameter portions of one pair of passages being connected to a first one of said ports, said small diameter portions of a second pair of passages being connected to a second one of said ports and the remaining ones of said ports each being connected to a large diameter portion and a small diameter portion.

12. A valve construction, comprising:
   a valve body having a plurality of outwardly opening ports;
   a spaced pair of passages in said valve body extending from one of said ports through the bottom wall thereof to others of said ports;
   valve means in said valve body for alternately closing said pair of passages and means for actuating said valve means;
   a plug threaded into said one port and spaced from said bottom wall thereof, said plug having a central opening extending therethrough into communication with the space between said plug and said bottom wall, said opening being spaced from said passages;
   a pair of needle valve members threaded axially through said plug into coaxially opposed relation with the adjacent ends of said passages, whereby inward axial adjustment of said needle valve members with respect to said plug will close said ends of said passages in said valve body.

13. A valve construction according to claim 12 in which the periphery of said plug is recessed for exposing portions of said needle valve members and including resilient means surrounding said plug at said recess and resiliently contacting said needle valve members for holding same against inadvertent threaded adjustment.

References Cited by the Examiner
UNITED STATES PATENTS

| | | | |
|---|---|---|---|
| 1,374,436 | 4/1921 | Conway | 137—606 |
| 2,821,997 | 2/1958 | Clay et al. | 137—596.17 |
| 2,876,988 | 3/1959 | Mornard | 137—606 XR |
| 3,012,578 | 12/1961 | Ludwig | 137—596.17 |

MARTIN P. SCHWADRON, *Primary Examiner.*